E. THOMSON.
CONDENSER.
APPLICATION FILED NOV. 16, 1916.
1,375,982.
Patented Apr. 26, 1921.
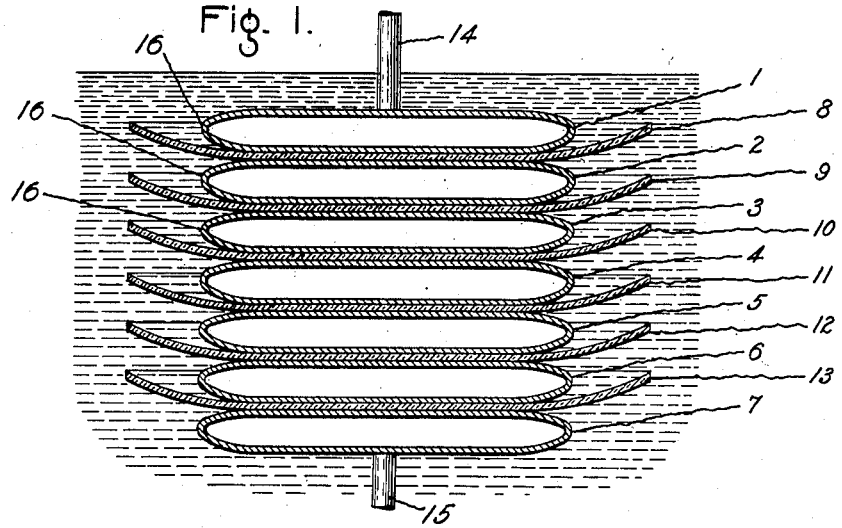
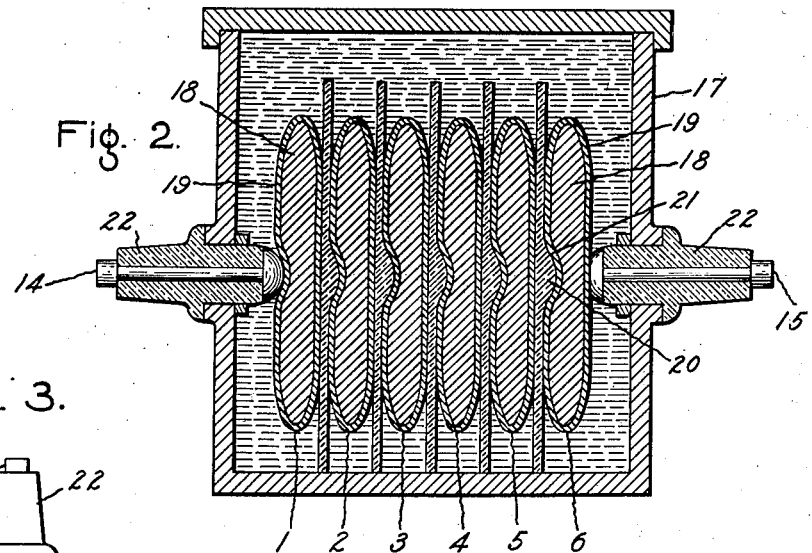
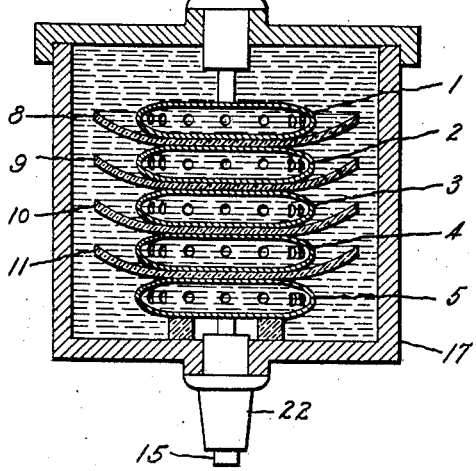
Inventor,
Elihu Thomson,
by Albert G. Davis
Att'y.

UNITED STATES PATENT OFFICE.

ELIHU THOMSON, OF LYNN, MASSACHUSETTS, ASSIGNOR TO GENERAL ELECTRIC COMPANY, A CORPORATION OF NEW YORK.

CONDENSER.

1,375,982.  Specification of Letters Patent.  Patented Apr. 26, 1921.

Application filed November 16, 1916. Serial No. 131,766.

*To all whom it may concern:*

Be it known that I, ELIHU THOMSON, a citizen of the United States, residing at Lynn, in the county of Essex, State of Massachusetts, have invented certain new and useful Improvements in Condensers, of which the following is a specification.

One of the objects of my present invention is to provide a form of electrostatic condenser which will be suitable for use in connection with high potential electrical distribution systems. A further object of my invention is to provide an efficient and simple construction for such a condenser.

In carrying my invention into effect I arrange a plurality of condenser elements in series relation in such a way that an electrode of each element serves also as an electrode of an element adjacent thereto. Terminals are provided for the first and last elements only of the series so that when a high voltage is applied to the terminals it will be distributed among all of the elements, each individual element being required to withstand only a fractional part of the entire voltage. I also make the electrodes of greater thickness than the dielectric which separates them and round off the edges in such a way that there is a gradual tapering away of the surface of the electrode from the dielectric, thereby avoiding the formation of corona discharges at the edges of the electrodes.

The novel features which I believe to be characteristic of my invention are set forth with particularity in the appended claims. The invention itself, however, with further objects and advantages will be best understood by reference to the following description taken in connection with the accompanying drawing in which, Figures 1, 2 and 3 illustrate as many different modifications of my invention.

As illustrated in Fig. 1, my improved condenser comprises a plurality of electrodes 1, 2, 3, etc., superimposed upon each other and separated by the dielectric members 8, 9, 10, etc. It is noted that with the arrangement shown electrode 2, for example, serves as electrode for both the upper element of the condenser and for the element immediately beneath. In the same way the electrodes 3, 4, 5 and 6 each serve as electrode for two adjacent elements. The electrodes 1 and 7 are provided with terminals 14 and 15 for connection to the distribution system with which the condenser is to be employed. With the construction shown each individual element may be adapted for a moderate voltage and all of the elements in series may be employed with high voltages, the total voltage applied to the terminals 14, 15 being distributed among the individual elements. In the form indicated the electrodes are hollow and the edges 16 are rounded so that the surface adjacent the dielectric will taper away from the dielectric in a curved line. By this construction the formation of destructive corona discharges at the edges of the electrode may be avoided. It will of course be understood that the electrodes may be made solid instead of hollow but this would involve the use of a much larger amount of metal and no appreciable advantage would result therefrom since it is only the metal near the surface which plays a part in the operation of the condenser. It is however essential that the electrodes should have an appreciable thickness with relation to the dielectric in order that the desired rounding off of the edges may be secured. I have shown the dielectric members 8, 9, 10, etc., as being dish shaped for convenience in holding the parts in the proper relation to each other. This construction also allows any gas bubbles which may form on the under surface of the dielectric to readily rise when the condenser is immersed in an insulating material such as oil, as indicated in the drawing.

In the modification shown in Fig. 2 the condenser is entirely inclosed in a case 17 which may be made either of metal or of insulating material, as desired. In this case the body 18 of the electrodes is composed of any cheap material which may be non-conducting if desired, and this body is covered by a conducting coating 19 which serves as the electrode proper. The coating in effect constitutes a conducting shell which has been reinforced by a suitable filling. In this case the units being assembled in vertical instead of horizontal planes, projections 20 are provided on the sheets of dielectric material which fit into corresponding depressions 21 in the electrodes, and thus serve to hold the electrodes in proper relation to each other. In case the container 17 is made of conducting material, insulating bushings 22 of any desired form may be employed for insulating the terminals 14 and 15 from the casing.

The modification shown in Fig. 3 differs from the one shown in Fig. 1 in that the electrodes are hollow and provided with perforations which allow the insulating material in which the condenser is immersed to penetrate the interior of the electrodes. This will prevent any tendency of the electrodes to float and will also provide for a better cooling of the electrodes in case the insulating material in which the condenser is immersed consists of a fluid which is adapted for cooling purposes.

While I have shown only three modifications of my invention, it will be apparent that many variations in the precise structure and arrangement of the elements may be made without departing from the scope of the appended claims.

What I claim as new and desire to secure by Letters Patent of the United States, is:—

1. A condenser comprising a series of hollow electrodes of conducting material separated by sheets of dielectric material of greater area than the electrodes, said electrodes being of greater thickness than the dielectric sheets, having their opposite surfaces substantially parallel and the edges thereof being rounded so that the opposite surfaces taper away in a curved line from the adjacent dielectric sheets, the outer electrodes only of the series being provided with terminals and the electrodes and dielectrics being completely immersed in a non-conducting liquid.

2. A condenser adapted for use with high potentials comprising a plurality of elements each comprising a pair of hollow electrodes of conducting material separated by a sheet of dielectric material and arranged in series in such a way that an electrode of each element also serves as an electrode of an adjacent element, the opposite surfaces of said electrodes being substantially parallel and the edges of the electrodes being rounded so that the opposite surfaces taper away from the adjacent dielectric sheets.

3. A condenser comprising a series of hollow perforated electrodes having two substantially flat and parallel faces and having rounded edges separated by sheets of dielectric material of greater area than the electrodes, the outer electrodes only of the series being provided with terminals and the electrodes and dielectrics being completely immersed in a non-conducting liquid.

4. A condenser comprising a series of conducting shells, sheets of dielectric material arranged between the same and terminals connected to the end shells of said series only, the opposite surfaces of said shells being substantially parallel and the portions of said shells between said surfaces being tapered away from the adjacent sheets of dielectric material.

In witness whereof, I have hereunto set my hand this 13th day of November 1916.

ELIHU THOMSON.